United States Patent
Gurram et al.

(10) Patent No.: US 11,599,664 B1
(45) Date of Patent: *Mar. 7, 2023

(54) DATA CERTIFICATION PROCESS FOR CLOUD DATABASE PLATFORM

(71) Applicant: Capital One Services, LLC, McLean, VA (US)

(72) Inventors: Nagender Gurram, Glen Allen, VA (US); Yudhish Batra, McLean, VA (US); Syed Shamaz Salim, North Potomac, MD (US); Praveen Kandukuri, Ashburn, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/840,464

(22) Filed: Jun. 14, 2022

Related U.S. Application Data

(63) Continuation of application No. 17/550,032, filed on Dec. 14, 2021, now Pat. No. 11,392,715.

(51) Int. Cl.
*G06F 16/25* (2019.01)
*G06F 21/62* (2013.01)
(Continued)

(52) U.S. Cl.
CPC ...... *G06F 21/6227* (2013.01); *G06F 16/2365* (2019.01); *G06F 16/2445* (2019.01);
(Continued)

(58) Field of Classification Search
CPC ............ G06F 21/6227; G06F 16/2365; G06F 16/2445; G06F 16/24564; G06F 16/24575; G06F 16/256; G06F 2221/2141
See application file for complete search history.

(56) References Cited

U.S. PATENT DOCUMENTS

| 10,970,303 | B1 | 4/2021 | Denton et al. |
| 2004/0085363 | A1* | 5/2004 | Lawrence ......... G06F 16/24575 |
| | | | 715/802 |

(Continued)

OTHER PUBLICATIONS

Aug. 16, 2021, VentureBeat, Lazzaro, "How to migrate to Snowflake without getting 'data drunk'," <<https://venturebeat.com/2021/08/16/how-to-migrate-to-snowflake-without-getting-data-drunk/>>, 8 pages.

(Continued)

*Primary Examiner* — Wilson Lee
(74) *Attorney, Agent, or Firm* — Banner & Witcoff, Ltd.

(57) ABSTRACT

Methods, systems, and apparatuses for providing access to records of a database stored on a database server in a cloud database platform are described herein. A data sharing platform may determine a shared view definition for access to the database. The data sharing platform may determine rules that specify criteria that limit access to the records stored by the database. The one or more first rules may be received via a user interface. The data sharing platform may perform, based on the rules, a data access certification process on the records stored by the database to generate a table of certification results. The data sharing platform may generate, based on the table of certification results, and without modifying the records stored by the database, a limited consumer view definition. Based on updates to the records, a new limited consumer view definition may be generated.

20 Claims, 10 Drawing Sheets

(51) Int. Cl.
 *G06F 16/2457* (2019.01)
 *G06F 16/2455* (2019.01)
 *G06F 16/23* (2019.01)
 *G06F 16/242* (2019.01)

(52) U.S. Cl.
 CPC .. *G06F 16/24564* (2019.01); *G06F 16/24575* (2019.01); *G06F 16/256* (2019.01); *G06F 2221/2141* (2013.01)

(56) References Cited

U.S. PATENT DOCUMENTS

| | | | |
|---|---|---|---|
| 2004/0181543 | A1* | 9/2004 | Wu .................. G06F 16/90328 707/999.102 |
| 2007/0027880 | A1 | 2/2007 | Dettinger et al. |
| 2009/0254916 | A1 | 10/2009 | Bose et al. |
| 2010/0174709 | A1 | 7/2010 | Hansen et al. |
| 2012/0131591 | A1 | 5/2012 | Moorthi et al. |
| 2013/0117305 | A1 | 5/2013 | Varakin et al. |
| 2013/0239228 | A1 | 9/2013 | Cinarkaya et al. |
| 2014/0006384 | A1 | 1/2014 | Jerzak et al. |
| 2014/0089495 | A1 | 3/2014 | Akolkar et al. |
| 2014/0281909 | A1* | 9/2014 | Pinto .................. G06F 9/45529 707/810 |
| 2018/0309801 | A1 | 10/2018 | Rathod |
| 2020/0042734 | A1* | 2/2020 | Lee .................... G06F 21/6218 |
| 2020/0219028 | A1 | 7/2020 | Papaemmanouil et al. |
| 2021/0089560 | A1 | 3/2021 | Funke et al. |
| 2021/0216983 | A1* | 7/2021 | Glickman ........... H04L 63/0414 |
| 2021/0334283 | A1 | 10/2021 | Gladwin et al. |

OTHER PUBLICATIONS

Nadilytics—The Intelligence Platform on top of Snowflake. Retreived from https://www.nadilytics.com/, retrieved online May 14, 2021, at 4:25:15 pm.

Snowflake for Data Sharing, Snowflake Workloads, <<https://www.snowflake.com/workloads/data-sharing/>>, date of publication unknown but, prior to Jul. 13, 2021, 3 pages, published Aug. 2020.

Data Governance is Worth the Time and Trouble, <<https://www.snowflake.com/trending/data-governance-framework>>, date of publication unknown but, prior to Jul. 13, 2021, 14 pages.

Working with Secuve Views, Snowflake Documention, <<https://docs.snowflake.com/en/user-guide/views-secure.html>>, date of publication unknown but, prior to Jul. 13, 2021, 3 pages, published Aug. 2020.

Data governance with Snowflake: 3 things you need to know, <<https://www.talend.com/resources/data-governance-snowflake-3-things-to-know/, date of publication unknown but, prior to Jul. 13, 2021, 11 pages.

GPDR: A quick way to reduce scope, <<https://www.talend.com/resources/anonymize-data/>>, date of publication unknown but, prior to Jul. 13, 2021, 6 pages.

Jun. 14, 2019, Mushtaq, Data preprocessing in detail, <<https://developer.ibm.com/technologies/data-science/articles/data-preprocessing-in-detail/>>, 9 pages.

Wikipedia, Data pre-processing, <<https://en.wikipedia.org/wiki/Data_pre-processing>>, date of publication but, prior to Jul. 13, 2021, 4 pages.

Snowflake Data Exchange, <<https://resources.snowflake.com/solution-briefs/data-exchange-solution-brief>>, date of publication unknown but, prior to Jul. 13, 2021, 2 pages.

Zhao, et al., "SLA-based Profit Optimization Resource Scheduling for Big Data Analytics-as-a-Service Platforms in Cloud Computing Environments," IEEE Transactions on Cloud Computing, Dec. 27, 2018.

* cited by examiner

| Name (801a) | Credit Card Number (801b) | Location (801c) |
|---|---|---|
| Bob Smith | 1234-5678-9123-4567 | New York City |
| Kim Jones | 4567-8912-3456-7891 | Virginia |
| Luke Thomas | 8912-3456-7891-2345 | Virginia |

Shared View
(800)

| Name (801a) | Credit Card Number (801b) | Location (801c) |
|---|---|---|
| Bob LASTNAME | 4567 | Northeast US |
| Kim LASTNAME | 7891 | Northeast US |
| Luke LASTNAME | 2345 | Northeast US |

First Limited Consumer View Definition
(803a)

| Name (801a) | Credit Card Number (801b) | Location (801c) |
|---|---|---|
| Bob Smith | | New York City |
| Kim Jones | | Virginia |
| Luke Thomas | | Virginia |

Second Limited Consumer View Definition
(803b)

FIG. 8

This database contains credit card data for adults aged 30-40 in the United States.

See Data From:

[X] New York City  [ ] Boston  [X] Virginia

See Credit Card Numbers?

[ ] Yes  [X] Last 4 Digits  [ ] No

Obfuscate Last Names?

[X] Yes  [ ] No

User Interface
(900)

FIG. 9

| |
|---|
| No Invalid Values — 1001a |
| No Birthdates After CURRENT_DATE — 1001b |
| No Non-16 Digit Credit Card Numbers — 1001c |
| No Data Older than 3 Years Old — 1001d |

Rules
(1000)

FIG. 10

DATA CERTIFICATION PROCESS FOR CLOUD DATABASE PLATFORM

CROSS REFERENCE TO RELATED APPLICATIONS

This application is a continuation of U.S. application Ser. No. 17/550,032, entitled "Data Certification Process for Cloud Database Platform" and filed Dec. 14, 2021. The contents of the above listed application is expressly incorporated herein by reference in its entirety for any and all non-limiting purposes.

FIELD OF USE

Aspects of the disclosure relate generally to data storage and retrieval. More specifically, aspects of the disclosure relate to a data certification process for implementing privacy and data restrictions on a cloud database platform that provides access to shared databases.

BACKGROUND

Cloud database platforms such as the Snowflake architecture, produced by Snowflake Inc. of San Mateo, Calif., permit organizations to logically separate but natively integrate storage, computing, and services. Snowflake and similar "data warehouse as a service" platforms may provide users access to cloud database storage, whereby storage of data is maintained in separate servers. This process allows data creators to share their data with a wide variety of consumers. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. This process also allows users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

In addition to avoiding resource limitations associated with queries, another advantage of the Snowflake architecture is that it allows users to collect data in a way that is resilient. Because a user's laptop may be relatively underpowered, queries that request significant amounts of data may crash the laptop. Moreover, because a single device collects the results of a query, unexpected technical issues (e.g., power loss, Internet disconnects) may cause the entire query to fail. The Snowflake architecture is equipped with built-in replication and failover/failback procedures which avoid such crashes, thereby ensuring that data continuity may be preserved. That said, such robustness can come with a caveat: because the Snowflake architecture can handle larger and more robust queries, a user may submit a malformed or overly broad query and thereby inadvertently cause a virtual warehouse to spend considerable time and computing resources.

One way in which the Snowflake architecture improves conventional query execution is that Snowflake allows virtual warehouses to be created, modified, and destroyed as desired. This allows multiple queries to be executed simultaneously but separately. For example, the Snowflake architecture allows a first user from an organization to execute a first query in a first virtual warehouse at the same time that a second user from the same organization executes a second query in a second virtual warehouse. To preserve computing resources, the different virtual warehouses may be configured with different computing resources.

One useful feature in Snowflake is the ability to share data without needing to copy that data over from one storage device for another. This process might be referred to as a "zero copy" process, referring to the fact that the underlying data need not be copied for it to be shared. For example, an owner of data (which might also be referred to as a data producer and/or data creator) might sell access to all or portions of their data to one or more consumers, such that the one or more consumers might use virtual warehouses to access and execute queries against that data. In this manner, the consumers gain quick and easy access to the data, while the owner maintains control of the data. Advantageously, this means that needless copies of the data are not created, which means that updates to the data are available to all users.

One concern with Snowflake's data sharing functionality is that different consumers of data within the environment might need the data to be pre-processed and/or otherwise certified for different scenarios. For example, one consumer of financial data might want only portions of data that are particularly accurate and/or reliable, whereas another consumer of the data might be legally restricted to accessing only portions of the financial data. The existing manner in which virtual warehouses access data in the Snowflake environment does not account for these various needs, which can introduce problems into the data sharing process. For instance, if a consumer is legally permitted to only access a certain type of data stored in a database, then the provider of that data might be forced to generate an entirely new database comprising that data, effectively nullifying the various benefits of the Snowflake data sharing platform. As such, the process of sharing data with third party consumers can become a cumbersome and time-consuming process, requiring a significant amount of time and computing resources be devoted to data extraction, processing, and loading.

Aspects described herein may address these and other problems, and generally improve the manner in which data is processed and provided to users via virtual warehouses.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to providing access to records of a database stored on a database server by generating a limited consumer view definition via which a consumer of data might access data. Data producers may create data and store it in a database on a database server in a cloud database platform. For example, a company might generate financial records data through its operations, then store that data in the Snowflake platform. Using the Snowflake platform and/or similar cloud database platforms, that company may not only store their own data in the cloud (which has its own benefits, particularly with respect to the use of virtual warehouses), but may also readily share the data with others (e.g., consumers of that data, such as other organizations). The data might be provided through a data marketplace, whereby users might exchange (e.g., sell) access to their data as stored in the cloud database platform. This process may advantageously allow the data producer to share its data with other organizations (e.g., for a fee) in a manner which provides those consumers ready and convenient access to that data. That said, in many circumstances, the data producer might not want to provide the entirety of the data to consumers. As one example, the consumer might request only particularly reliable portions of the data producer's data. As another example, the consumer might be legally permitted to access only certain portions of data producer's data. In such circumstances, rules might be determined that limit consumer access to records of the data producer's data. Those rules might be set by the producer of the data (e.g., preventing the consumer from accessing confidential information) and/or by the consumer (e.g., a rule requesting only valid data). Then, based on those rules, a table of certification results might be generated, and a limited consumer view definition might be generated. That limited consumer view definition might be usable by the consumer to access a particular portion of the data stored by the database (and, in turn, might exclude a different portion of the data stored by the database). In this manner, the data producer can provide its data without having to modify and/or copy its data, the consumer has access to the latest form of the data, and the limited consumer view definition may be leveraged to ensure that the consumer receives appropriate data.

As one example of how aspects described herein may be implemented, a computing device may determine a shared view definition for access to the database stored on the database server, wherein the shared view definition is configured to provide access to all records stored by the database and to enable execution of queries against the database using processing resources of one or more virtual warehouses provided by the cloud database platform. The computing device may determine one or more first rules that specify criteria, associated with consumer permissions to access the database via the cloud database platform, that limit consumer access to the records stored by the database. The computing device may perform, based on the one or more first rules, a data access certification process on the records stored by the database to generate a table of certification results by accessing all records stored by the database using the shared view definition, generating a data certification result for each record based on determining, for each record, whether a given record satisfies the criteria of the one or more first rules based on one or more fields of the given record, and generating, based on the data certification result for each record, the table of certification results that indicates, for each record, whether the record satisfies the criteria of the one or more first rules. The computing device may generate, based on an intersection of the table of certification results and the shared view definition, and without modifying the records stored by the database, a limited consumer view definition configured to provide access to a first portion of the records in compliance with the criteria of the one or more first rules and exclude a second portion of the records not in compliance with the criteria of the one or more first rules without modifying the records stored by the database. The computing device may then cause a first virtual warehouse, of the one or more virtual warehouses, to execute a query on the first portion of the records in compliance with the criteria of the one or more first rules via the limited consumer view definition. The computing device may then cause output of a result of the query to a consumer authorized to access the database through the limited customer view definition.

Aspects described herein may also relate to an onboarding process, whereby consumers might define all or portions of the rules which limit their access to data. The computing device may determine a shared view definition for access to the database stored on the database server, wherein the shared view definition is configured to provide access to all records stored by the database and to enable execution of queries against the database using processing resources of one or more virtual warehouses provided by the cloud database platform. The computing device may determine one or more attributes of the database and provide, to a user device and based on the one or more attributes of the database, a user interface enabling creation of rules that specify criteria, associated with consumer permissions to access the database via the cloud database platform, that limit consumer access to the records stored by the database. The computing device may then generate, based on criteria received via the user interface, one or more first rules that limit the output of the data. The computing device may then perform, based on the one or more first rules, a data access certification process on the records stored by the database to generate a table of certification results by accessing all records stored by the database using the shared view definition, generating a data certification result for each record based on determining, for each record, whether a given record satisfies the criteria of the one or more first rules based on one or more fields of the given record, and generating, based on the data certification result for each record, the table of certification results that indicates, for each record, whether the record satisfies the criteria of the one or more first rules. The computing device may generate, based on an intersection of the table of certification results and the shared view definition, and without modifying the records stored by the database, a limited consumer view definition configured to provide access to a first portion of the records in compliance with the criteria of the one or more first rules and exclude a second portion of the records not in compliance with the criteria of the one or more first rules without modifying the records stored by the database. Then, the computing device may cause a first virtual warehouse, of the one or more virtual warehouses, to execute a query on the records in compliance with the criteria of the one or more first rules via the limited consumer view definition.

Aspects described herein may also relate to a process that addresses updates to the data. The computing device may detect, via the shared view definition, an update to at least one record of the records stored by the database. The computing device may then perform the data access certification process on the updated records to generate a second table of certification results. The computing device may generate, based on the first table of certification results, the second table of certification results, and the shared view definition, a updated limited consumer view definition different from the limited consumer view definition. Then, the computing device may cause a first virtual warehouse, of the one or more virtual warehouses, to execute a query on the first portion of the records in compliance with the criteria of the one or more first rules via the updated limited consumer view definition.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 8 depicts an illustrative application of a shared view definition, an illustrative first limited consumer view definition, and an illustrative second limited consumer view definition with respect to illustrative data.

FIG. 9 depicts an illustrative user interface enabling creation of rules that specify criteria that limit consumer access to records stored by a database.

FIG. 10 depicts illustrative rules.

DETAILED DESCRIPTION

Figure 1:
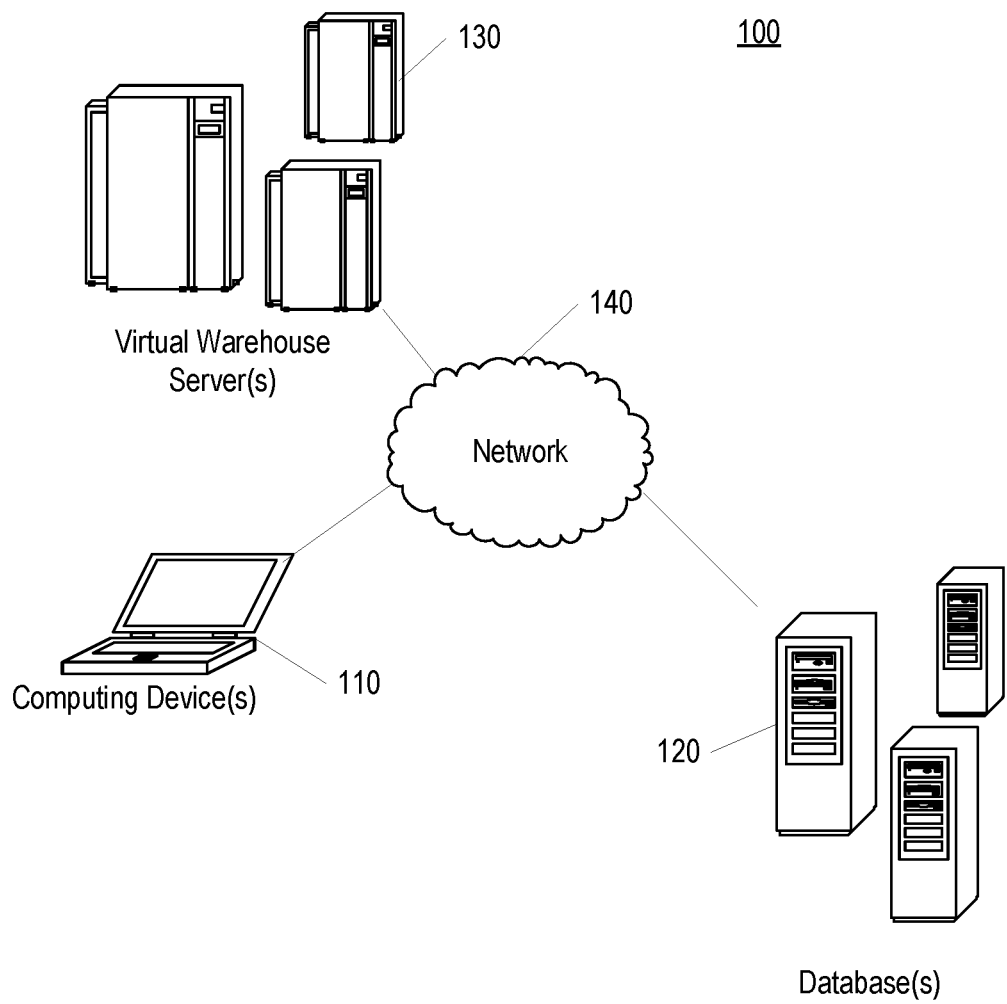
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for allowing data producers to share data with consumers in a data sharing marketplace, and in particular a manner in which limits can be placed on consumer access to shared data. This functionality is effectuated via limited consumer view definitions which limits consumers to portions of data in compliance with one or more rules. Those rules may be established by the data producer, the consumer, and/or other parties. In this manner, the data stored by the cloud database platform might be freely shared by the data producer without requiring that the data itself be duplicated, modified, and/or otherwise processed to be shared. This process might be referred to as a "zero copy" process, whereby data might be shared near-instantaneously and without requiring that the data be copied or otherwise modified for the consumer's use. The aforementioned limited consumer view definitions provide limits on data provided to consumers via the cloud database platform when such consumers perform queries via virtual warehouses. For example, these limited consumer view definitions can allow consumers to access portions of data to which they are legally permitted to access while preventing those same consumers from inadvertently gaining access to portions of the data to which they are not legally permitted to access. This avoids the need to maintain additional cloud storage (and/or file transfer protocol setups), reduces the staff expense to prepare and send data, removes the need to pay for storage or a database to house duplicative data, and generally just results in an easier-to-maintain marketplace for data sharing.

One advantage of the present disclosure is that the limited consumer view definitions generated herein need not modify and/or copy any data stored in the Snowflake environment. This approach has numerous benefits. On one hand, because the data need not be copied over to a separate database, one single copy of the data may be stored, and thus updates to various records of the data need only be performed once (and, e.g., all consumers of the data have access to the latest copy of the data at any given time). On the other hand, by ensuring that the limited consumer view definitions reflect rules (and, e.g., not the data itself), changes to the rules might be made over time. For example, a first rule might provide that a consumer is permitted to access only the last four digits of a credit card number. That rule might be later changed to provide that a consumer is permitted to access the last eight digits of the credit card number. In such a circumstance, under conventional setups (where, e.g., copies of a database are made and rules are applied to that copy), an entirely new copy of the database may need to be generated: after all, a first copy of the database comporting with the first rule might have had data deleted from it, such that the first copy of the database no longer contains the last eight digits of the credit card number. In contrast, in the present disclosure, to comply with the modified rule, the limited consumer view definition might be modified, and the underlying data need not be changed.

In turn, the present disclosure is significantly different than conventional data filtering and organization processes at least because it is fundamentally rooted in a cloud database platform that features zero-copy data sharing and view definitions leveraged by virtual warehouses. A cloud database platform, such as Snowflake, enables the use of limited consumer view definitions and virtual warehouses in a manner which permits the application of rules in a manner separate from storage of the underlying data itself. As such, as a consumer executes queries against one or more databases in the cloud database platform using processing resources of one or more virtual warehouses provided by the cloud database platform, limited consumer view definitions can serve to limit the consumer's access to that data regardless of the nature of the query, the nature of the processing resources used, or the like.

The present disclosure also improves the functioning of computers by improving the manner in which queries are executed with respect to one or more data warehouses. Conventional (e.g., non-cloud) data storage approaches can be wasteful, particularly when data is shared between different consumers. For example, for a data creator to share data with a consumer, that creator might send the entirety of the data over to the consumer. This can waste unnecessary storage space and computing resources, and introduces a large number of other concerns (e.g., versioning, privacy control, etc.). In contrast, the present disclosure avoids these issues by maintaining a single version of the data, while providing limited consumer view definitions that nonetheless allow consumers limited access to that data. This avoids the unnecessary (e.g., duplicative) storage of additional copies of the data, ensures that all consumers have access to the latest form of the data, and allows for the rules underpinning limited consumer view definitions to be changed as desired.

The present disclosure is also fundamentally rooted in computing devices and, in particular, an environment with virtual warehouses. Presently, Snowflake's architecture is unique in that it allows for the cloud storage of data, with consumers of that data able to access the data through virtual warehouses. In contrast, other database systems rely on monolithic systems to handle all enterprise needs. It is precisely this architecture of Snowflake (and similar virtual warehouse systems) that is leveraged by the improvements discussed herein.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 may be located in a first location (e.g., the offices of a corporation), and the virtual warehouse servers 130 and/or the data warehouses 120 may be located in a variety of locations (e.g., distributed in a redundant manner across the globe). This may protect business resources: for example, if the Internet goes down in a first location, the distribution and redundancy of various devices may allow a business to continue operating despite the outage.

The virtual warehouse servers 130 may be all or portions of a virtual warehouse as a service system, such as is provided via the Snowflake architecture. For example, the computing devices 110 and/or the data warehouses 120 may be managed by an organization. In contrast, the virtual warehouse servers 130 may be managed by a different entity, such as Snowflake Inc. In this manner, a third party (e.g., Snowflake) may provide, as a service, virtual warehouses which may operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse may be a single database, a collection of databases, or the like. A data warehouse may be structured and/or unstructured, such that, for example, a data warehouse may comprise a data lake. A data warehouse may store data in a variety of formats and in a variety of manners. For example, a data warehouse may comprise textual data in a table, image data as stored in various file system folders, and the like.

The data transferred to and from various computing devices in a system 100 may include secure and sensitive data, such as confidential documents, consumer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
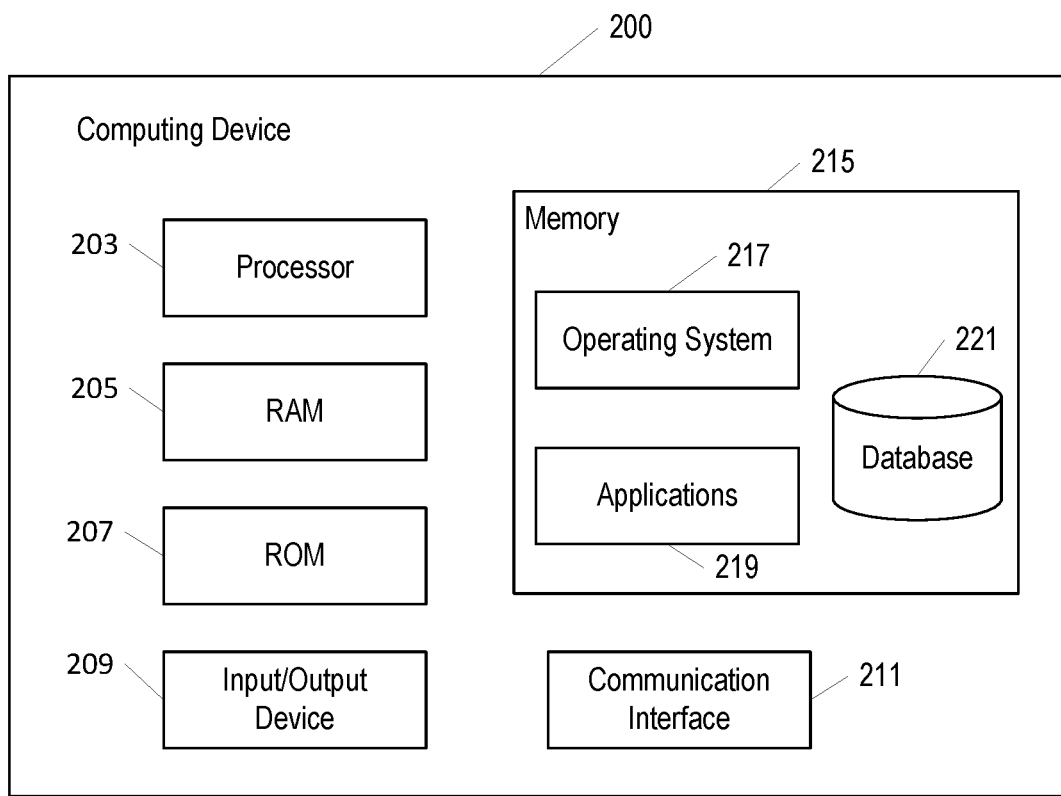
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
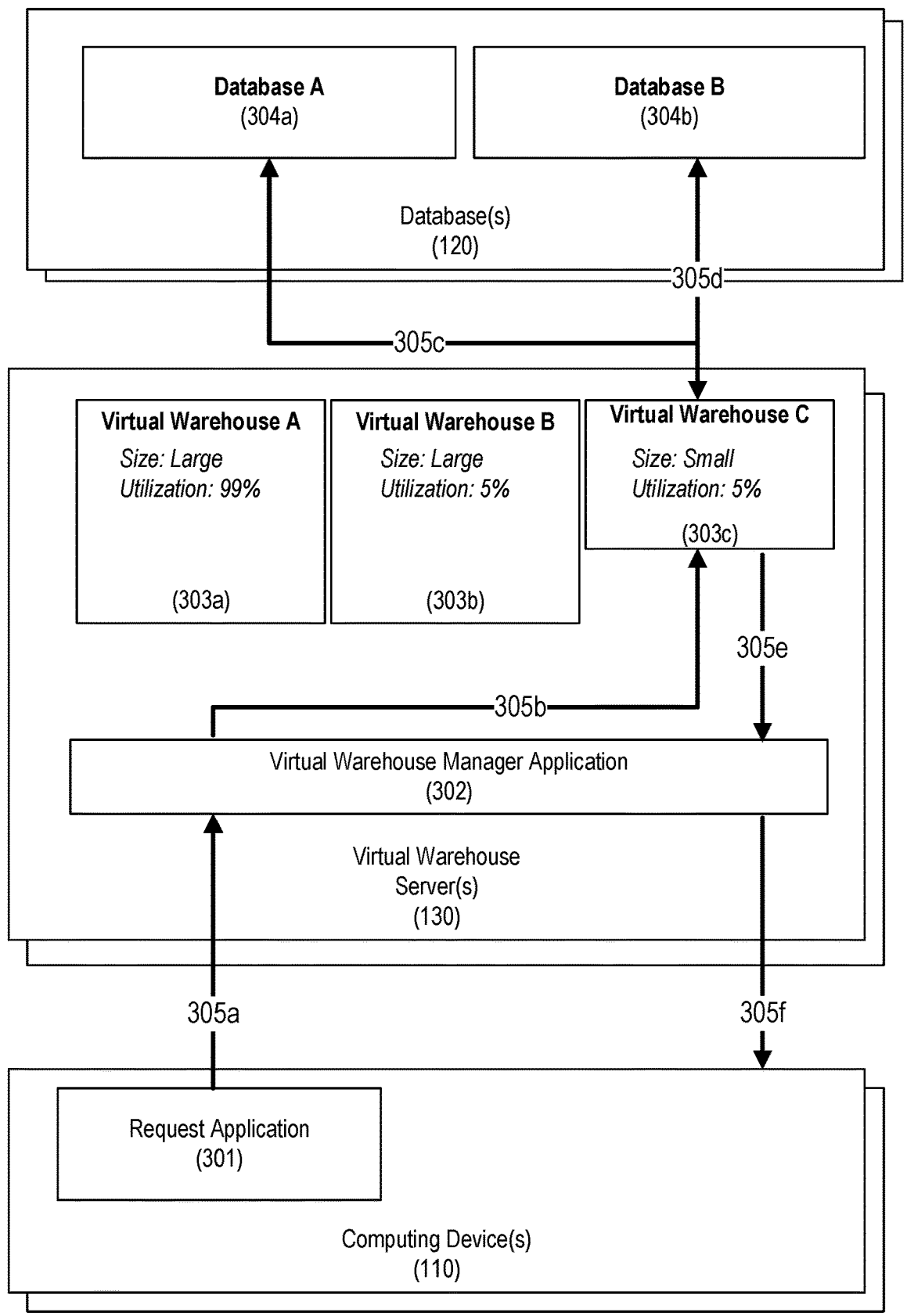
FIG. 3 depicts computing devices, virtual warehouse servers, and data warehouses working in conjunction to enable execution of queries.

FIG. 3 shows a system comprising a data sharing platform 307 (which comprises, e.g., the computing devices 110 of FIG. 1) and a cloud database platform 306 (which comprises, e.g., the virtual warehouse servers 130 and the data warehouses 120 of FIG. 1). FIG. 3 may depict all or portions of a system configured according to the Snowflake architecture or a similar architecture, which provides access to cloud databases (in a database-as-a-service format) via which users may share via a data marketplace and/or may submit queries using one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by Snowflake Inc., of San Mateo, Calif.

The data sharing platform 307 and cloud database platform 306 are shown as separate in FIG. 3. In some instances, the data sharing platform 307 and the cloud database platform 306 (and/or any portions thereof) may be managed by the same or different entities. For example, the cloud database platform 306 may correspond to preexisting Snowflake architecture managed by Snowflake Inc. of San Mateo, Calif., whereas the data sharing platform 307 may be managed by another organization. In practice, some of the computing devices, networks, and other aspects of the data sharing platform 307 and/or the cloud database platform 306 may overlap. For instance, some of the devices managed by one entity might be located in offices managed by Snowflake, and/or the devices in the data sharing platform 307 may be communicatively coupled to devices in the cloud database platform 306 via a private network.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month").

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, or the like.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303b and the virtual warehouse C 303c, at least because both have a low utilization rate and thus may be capable of handling the request received from the request application 301. From that subset, one or more virtual warehouses may be selected to execute the query. For example, as shown in the example provided in FIG. 3, the virtual warehouse C 303c has been selected to address the query. This may be because, for example, the query may be small (that is, the execution plan may be simple or otherwise quick to handle), such that executing the query on the virtual warehouse C 303c may be cheaper and may free up the virtual warehouse B 303b for handling larger, more complex queries.

Virtual warehouses, such as the virtual warehouse A 303a, the virtual warehouse B 303b, and/or the virtual warehouse C 303c, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Broadly, such quantities of computing resources may be referred to via "t-shirt sizes," such that one virtual warehouses may be referred to as "large," whereas another may be referred to as "small." Virtual warehouses may be resized such that, for example, the virtual warehouse A 303a (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to enable execution of queries, collect results, and provide those results.

Virtual warehouses may use one or more view definitions to retrieve content from the databases 120. For example, a virtual warehouse might use a view definition to specify which portion(s) of data stored in the databases 120 should be displayed to a user. Such view definitions might be established such that, for example, a consumer of data might not have access to all data stored by a database, but rather might be limited to a portion of that data.

Though the virtual warehouse manager application 302 is shown as part of the virtual warehouse servers 130, the virtual warehouse manager application 302 may execute on a wide variety of computing devices. For example, the virtual warehouse manager application may execute on one or more of the computing devices 110, such as the same computing device 110 hosting the request application 301. As another example, the virtual warehouse manager application may execute on an entirely separate computing device. Because the virtual warehouse manager application 302 may perform steps above and beyond conventional virtual warehouse functionality, the application may execute on an entirely separate computing device and may interface with preexisting virtual warehouse systems, e.g., Snowflake.

As part of step 305c and 305d, the selected virtual warehouse (in this case, the virtual warehouse C 303c) may execute the query requested by the request application 301. As shown in FIG. 3, this entails querying both the data warehouse A 304a and the data warehouse B 304b. The data warehouses 120, such as the data warehouse A 304a and the data warehouse B 304*b*, need not be the same: for example, the data warehouse A 304*a* may have an entirely different format, may have entirely different schedules which affect their size at any given time, and may have an entirely different structure as compared to the data warehouse B 304*b*. For instance, the data warehouse A 304*a* may comprise a SQL database, whereas the data warehouse B 304*b* may comprise a file server which stores files according to the File Allocation Table (FAT) file system. As part of this process, the virtual warehouse C 303*c* may receive, store, and/or organize results from the data warehouses 120. For example, the virtual warehouse C 303*c* may receive query results from the data warehouse A 304*a* and the data warehouse B 304*b*, may store those results in memory, and then may encrypt those results for security purposes.

As part of step 305*e*, the virtual warehouse C 303*c* provides the collected results to the virtual warehouse manager application 302. Then, as part of step 305*f*, the virtual warehouse manager application 302 provides the results to one or more of the computing devices 110. This process is optional, as the virtual warehouse C 303*c* may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

The steps depicted in FIG. 3 are illustrative, and represent simplified examples of processes which may be performed by the elements depicted in FIG. 3. For example, while step 305*a* is reflected as an arrow directly leading from the request application 301 to one or more of the virtual warehouse servers 130, the request may in fact be routed through various other computing devices as part of the network 140. As another example, the query process reflected in step 305*c* and step 305*d* may involve a plurality of different transmissions between the virtual warehouse C 303*c* and the data warehouses 120.

Figure 4:
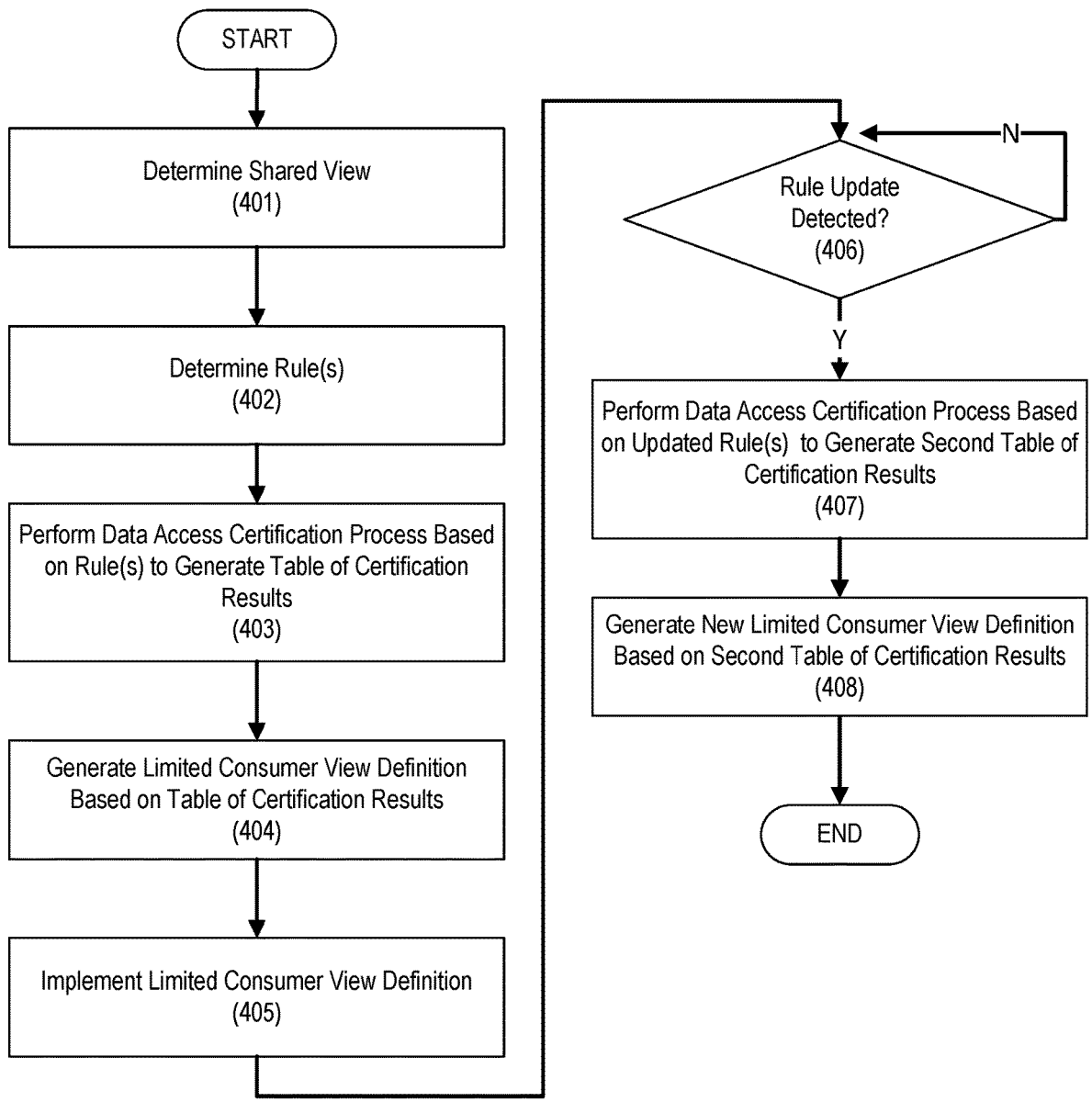
FIG. 4 shows a flow chart which may be performed to generate a limited consumer view definition based on a data access certification process.

As a preliminary introduction to FIG. 4, in the circumstance where a data producer has shared data with a consumer via a data marketplace, one or more rules might be used to generate a limited consumer view definition which limits the ability of that consumer to access the data. To generate such a limited customer view definition, a computing device might perform a data access certification process, by which a shared view definition of the data (which may display all data) is used to generate a table of certification results by processing the data and determine which record(s) of the data comply with the one or more rules.

FIG. 4 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 4. The steps depicted in FIG. 4 may operate on a Snowflake environment or other virtual warehouse environment, such that they may be performed by a computing device within or external to such an environment. For example, the steps depicted in FIG. 4 may be performed on a user device external to the cloud database platform.

In step 401, a computing device may determine a shared view definition. For example, the computing device may determine a shared view definition for access to the database stored on the database server. A shared view definition may be configured to provide access to all records stored by the database. For example, the shared view definition might be a default view with which an owner of data can access their own data. In this manner, records of the data might not be excluded when viewed via the shared view definition. The shared view definition may be additionally and/or alternatively configured to enable execution of queries against the database using processing resources of one or more virtual warehouses provided by the cloud database platform. For example, a user might, via the shared view definition, use the virtual warehouse 303*a* to query one or more of the databases 120.

In step 402, the computing device may determine one or more rules. A rule may specify criteria which relates to limits to a consumer's access to a database. A computing device may determine these rules to determine limits on consumer access to records stored by a database. For example, the computing device may determine one or more first rules that specify criteria, associated with consumer permissions to access the database via the cloud database platform, that limit consumer access to the records stored by the database.

The one or more first rules might prevent output of invalid values. Some consumers of data might want to receive (e.g., view) only data which is valid and/or reliable. As a simple example, "NaN" (not a number) values might be excluded if such values are included in fields expected to have numbers.

The one or more first rules might prevent output of values outside of a predefined range. As was the case with the circumstance described above, some consumers of data might want to receive (e.g., view) only data which is valid and/or reliable. For example, data indicating a birthdate after the current day might be excluded because such data is almost certainly inaccurate (or, at least, speculative). As another example, for a column corresponding to age, values under zero or over one hundred and fifty might be excluded.

The one or more first rules might prevent output of values that do not match a regular expression pattern. Certain data might be in a predefined format such that values not comporting with that format might be considered invalid. For example, for a column corresponding to a date and time, values that do not match conventional date/time formats might be excluded. As another example, because credit card numbers are conventionally sixteen digits, at least one of the one or more first rules might specify that values in a column corresponding to credit card numbers that are not sixteen digits should be excluded.

The one or more first rules may prevent output of data that was not created, modified, or otherwise processed within a time period. Certain consumers might want to gain access to data within a certain time period. As such, for example, the one or more first rules may prevent output of data outside a time period specified by the at least one rule (e.g., older than three years).

At least one of the one or more first rules might cause generation of an alert. Rules may limit consumers' access to data to an undesirably extreme degree, to the point where the data received by users might be unusable and/or undesirably fragmented. In turn, alerts might be generated in circumstances where insufficient quantities of data are output to a consumer. For example, at least one of the one or more first rules may be configured to cause output of an alert based on a determination that more than a predetermined percentage of the records is not output based on the one or more first rules. In this manner, the creator of the one or more rules might be alerted that the rules might be over-restricting consumer access to data. Such an alert might, for example, prompt the creator of the one or more rules to modify the rules.

In step 403, the computing device may perform a data access certification process based on the one or more rules to generate a table of certification results. The data access certification process may be configured to generate the table of certification results so as to indicate whether data complies with the one or more first rules. For example, the computing device may perform, based on the one or more first rules, a data access certification process on the records stored by the database to generate a table of certification results.

To perform the data access certification process, the computing device may access all records stored by the database using the shared view definition. In this manner, the computing device might retrieve, from a database, all records of data stored by the database. To perform this step, the computing device may use the shared view definition, which may provide access to all records of data stored by the database.

To perform the data access certification process, the computing device may generate a data certification result for each record based on determining, for each record, whether a given record satisfies the criteria of the one or more first rules based on one or more fields of the given record. In this manner, the computing device might iterate through all records stored in the data stored by the database to determine, for each record, compliance with the criteria of the one or more first rules. This process might correspond to each record (e.g., each row of the database) as well as each field (e.g., each column of the database). For example, a record might be considered to not satisfy the criteria of the one or more first rules because a field in the record does not satisfy the one or more first rules.

To perform the data access certification process, the computing device may generate, based on the data certification result for each record, the table of certification results that indicates, for each record, whether the record satisfies the criteria of the one or more first rules. In this manner, the table of certification results may be in some ways similar to the data stored by the database itself, such that the table of certification results indicates, for each field of each record of the data, whether the field satisfied the one or more first rules. As a simple example of such a table, the table of certification results might comprise a plurality of Boolean values for each field in the data, with each indicating whether or not a particular field satisfied the one or more rules.

Generating the table of certification results may comprise adding, to the table of certification results and based on at least one of the one or more first rules, an indication that a first value in a first field should be replaced with a second value. In certain circumstances, a value in a field of a record of the data might satisfy a rule if it is replaced with a second value. Such replacement might comprise truncating and/or otherwise modifying the original data. For example, a sixteen-digit credit card number might be replaced with only the last four digits of the sixteen-digit credit card. Such replacement might comprise entirely replacing the original data with a summary of the data. For example, a specific state (e.g., "Maine") might be replaced with a generic identifier of a region (e.g., "Northeast").

In step 404, the computing device may generate a limited consumer view definition based on the table of certification results. The limited consumer view definition may be a view definition configured to limit access to the data based on the table of certification results. That limited consumer view definition might be configured to prevent access to portions of the data that did not satisfy the one or more rules. For example, the computing device may generate, based on an intersection of the table of certification results and the shared view definition, and without modifying the records stored by the database, a limited consumer view definition configured to provide access to a first portion of the records in compliance with the criteria of the one or more first rules and exclude a second portion of the records not in compliance with the criteria of the one or more first rules without modifying the records stored by the database.

An intersection of the table of certification results and the shared view definition may be generated using an algorithm that returns common data sets. The shared view definition and the table of certification results may each comprise a plurality of rows, and the intersection of those two objects may comprise common rows shared between the two objects. For example, assume the shared view definition comprises rows A, B, and C, whereas the table of certification results comprises rows B and C. In such a circumstance, the intersection of the table of certification results and the shared view definition may comprise rows B and C, but not row A.

In step 405, the computing device may implement a limited consumer view definition. Implementing the limited consumer view definition may comprise providing the limited consumer view definition to one or more consumers. For example, the computing device may cause a first virtual warehouse, of the one or more virtual warehouses, to execute a query on the first portion of the records in compliance with the criteria of the one or more first rules via the limited consumer view definition. As part of step 405, the computing device may cause output of a result of the query to a consumer authorized to access the database through the limited customer view definition.

Step 406 through step 409 describe a process whereby the computing device might respond to rules being updated. As indicated above, one advantage of the present disclosure is that it allows the rapid implementation of rule modifications without requiring that the underlying data be modified.

In step 406, the computing device may detect whether a rule has been updated. For example, the computing device may receive an update to the one or more first rules. A rule update might be any change to the one or more rules, such as the addition of a new rule, the removal of a rule, the modification of an existing rule, or the like. For example, a rule requiring that data be younger than one year old might be replaced with a rule requiring that data be younger than six months old. If an update to a rule is detected, the flow chart proceeds to step 407. Otherwise, the computing device may continue to wait, and/or the flow chart may end.

In step 407, the computing device may perform the data access certification process based on the updated rules to generate a second and/or updated table of certification results. The data access certification process might be the same or similar as that discussed with respect to step 403 of FIG. 4. For example, the computing device may perform, based on the update to the one or more first rules, the data access certification process to update the table of certification results generated as part of step 403, and/or may generate a second table of certification results. The second table of certification results might be similar to the table of certification results and based on at least one of the one or more first rules generated in step 403, albeit with differences based on the update to the rule detected in step 406.

The decisions as to whether to generate a new table of certification results versus update an existing table of certification results (e.g., the table generated in step 403) may be based on a variety of different factors. For example, a new (second) table of certification results might be generated if, for example, an existing table of certification results is preserved for logging, security, and/or if the existing table of certification results is used for a variety of different customers. As another example, an existing table of certification results may be generated in circumstances where, for example, each customer has their own table of certification results.

In step 408, the computing device may generate a updated limited consumer view definition based on the second table of certification results. For example, the computing device may generate, based on the second table of certification results, a updated limited consumer view definition. This step may be the same or similar as step 404, albeit in view of the second table of certification results generated in step 407.

In step 409, the computing device may implement the second limited consumer view definition. This step may be the same or similar as step 405, albeit using the updated limited consumer view definition generated in step 408.

As will also be described in greater detail below with respect to FIG. 6, the computing device may be configured to detect updates to data and react by generating a updated limited consumer view definition. The computing device may detect an update to at least one record. The computing device may then perform the data access certification process on the update generate a second table of certification results. The computing device may then generate, based on the table of certification results and the second table of certification results, a updated limited consumer view definition. In this manner, updates to the data might be reflected in the updated limited consumer view definition. This advantageously may ensure that consumers of data have the latest version of the data.

Figure 5:
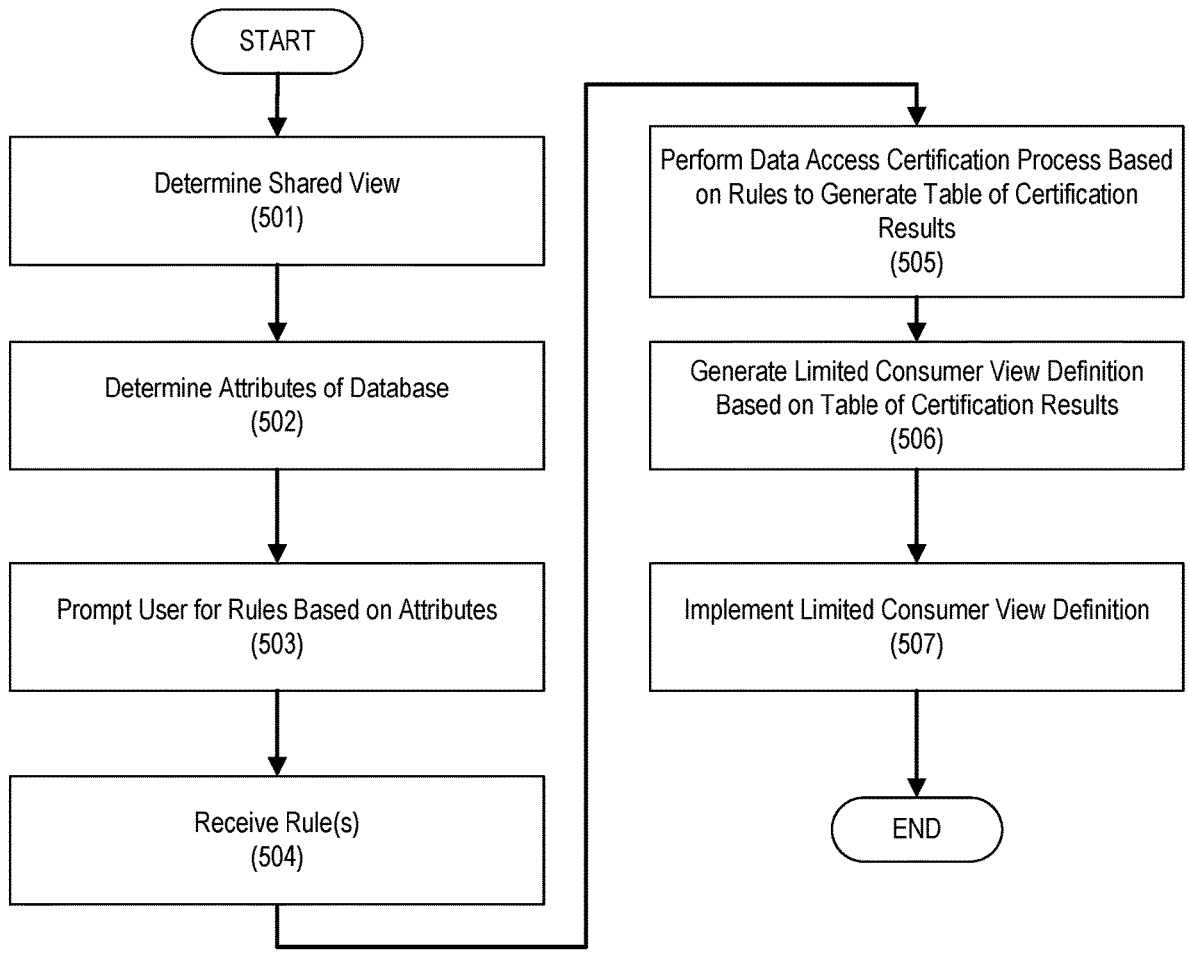
FIG. 5 shows a flow chart which may be performed to prompt users for rules based on attributes of a database.

As an introduction to FIG. 5, when a data producer shares data with a consumer, the consumer may be onboarded in a manner which generates a limited consumer view definition governing their access to that data. For example, as part of sharing data with a new consumer, a creator of that data might be prompted to generate rules for that consumer. In this manner, the consumer might be provided the data which they asked/paid for (e.g., and no more than the data which they are entitled to).

FIG. 5 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 5. The steps depicted in FIG. 5 may operate on a Snowflake environment or other virtual warehouse environment, such that they may be performed by a computing device within or external to such an environment. For example, the steps depicted in FIG. 5 may be performed on a user device external to the cloud database platform.

In step 501, the computing device may determine a shared view definition. This step may be the same or similar as step 401 of FIG. 4. For example, the computing device may determine a shared view definition for access to the database stored on the database server. As was the case with step 401, the shared view definition may be configured to provide access to all records stored by the database and to enable execution of queries against the database using processing resources of one or more virtual warehouses provided by the cloud database platform.

In step 502, the computing device may determine one or more attributes of the database. An attribute of the database may be any aspect describing the database, including a size of the database, names of columns of the database, information about data stored by the database, or the like. The attributes might indicate what kind of data is stored by the database. For example, the attributes might indicate that the database stores demographic information for voters in the United States, organized by city and state. As another example, the attributes might comprise a list of columns of a table as well as an age of each record (e.g., each row) of the table.

In step 503, the computing device may, based on the attributes, prompt the user for rules. In this manner, the computing device might provide a user the opportunity to create rules which limit access to data stored by the database. For example, the computing device may provide, to a user device and based on the one or more attributes of the database, a user interface enabling creation of rules that specify criteria, associated with consumer permissions to access the database via the cloud database platform, that limit consumer access to the records stored by the database. As an example of the interplay of step 502 and step 503, as part of step 502, the computing device may determine that the database comprises a table with a column comprising values that indicate the last name of a user. Then, as part of step 503, the computing device may permit a user to specify one or more rule(s) which might limit access to that last name. For example, the user might be allowed to make a rule obfuscating the last name (e.g., replacing the last name with a blank value, "LASTNAME," or the like), removing the last name entirely, permitting the last name to be included only if it satisfies a regular expression, or the like.

The prompt to the user for rules might entail use of a trained machine learning model, such as may be implemented via the deep neural network 700 of FIG. 7 (discussed below). Because of the complexity and volume of data that might be stored by the database, it may be valuable to help users think of different rules that might be implemented with respect to a database. To perform this task, a machine learning model might be trained to recommend rules. For example, the computing device may train a machine learning model to output recommended rules using training data that comprises a history of rules, applied to different databases, created by one or more users. In this manner, the machine learning model might be trained using information about what other kind of rules users have applied. The computing device may then provide, as input to the trained machine learning model, account metadata associated with the user and retrieve, as output from the trained machine learning model, one or more recommended rules. The account metadata might indicate, for example, an identity of the user (e.g., whether the user is a data owner, data consumer, what sort of limitations the user might have in terms of data they can access), and the like. The computing device may then cause display, in the user interface, of an indication of the one or more recommended rules. In this manner, the user might then select recommended rules with ease.

In step 504, the computing device may generate the rules. For example, the computing device may generate, based on criteria received via the user interface, one or more first rules that limit the output of the data. This process might be the same or similar as step 402 of FIG. 4, except that at least some of the rules might be generated via the prompt in step 503. For example, the user interface might enable a user to select criteria, and a rule might be generated based on that criteria. In this manner, while some of the rules might be received via the prompt in step 503, others might be received from external sources. The rules might be generated based on input (e.g., criteria specified via) the user interface. For example, at least one rule might be generated based on user input, via the user interface, specifying a range of values. As another example, at least one rule might be generated based on user input, via the user interface, specifying a category of values.

All or portions of the rules might originate from contract data. Consumers of data may be contractually and/or legally limited with respect to the data they may access. For example, for privacy reasons, a contract might provide that a consumer cannot access personally identifying information associated with users, but might instead provide that the consumer could access obfuscated versions of that data. In such a circumstance, one or more rules might exist that obfuscate personally identifying data (e.g., social security numbers, last names, addresses) by removing and/or replacing that data (e.g., removing the social security numbers, replacing all last names with "LASTNAME," and replacing the addresses with generic indication of geographic location). For example, the computing device may identify contract data associated with a contract for access to the database. The computing device may identify that contract data by receiving, via a user interface, the contract data. For example, a user might upload text data corresponding to the contract via the user interface. The contract data may be stored in a database associated with a user. The contract data might comprise, for example, text from a contract, a listing of rules from a contract, or the like. The computing device may then generate, based on processing the contract data, at least one of the one or more first rules. For example, based on using Natural Language Processing (NLP) algorithms on text corresponding to a contract, the computing device might determine the one or more first rules.

Once received, the rules might be added to a catalog. A catalog of user access to data stored by the cloud database platform may be maintained. That catalog might be used to record information about access to data, including one or more rules governing access to that data. For example, the computing device may update a catalog that stores information about access, by one or more users, to databases by adding, to the catalog, an indication of the one or more first rules.

In step 505, the computing device may perform a data access certification process based on the rules to generate a table of certification results. This process may be the same or similar as step 403 of FIG. 4.

In step 506, the computing device may generate a limited consumer view definition based on the table of certification results. This process may be the same or similar as step 404 of FIG. 4.

In step 507, the computing device may implement the limited consumer view definition. This process may be the same or similar as step 405 of FIG. 4.

Figure 6:
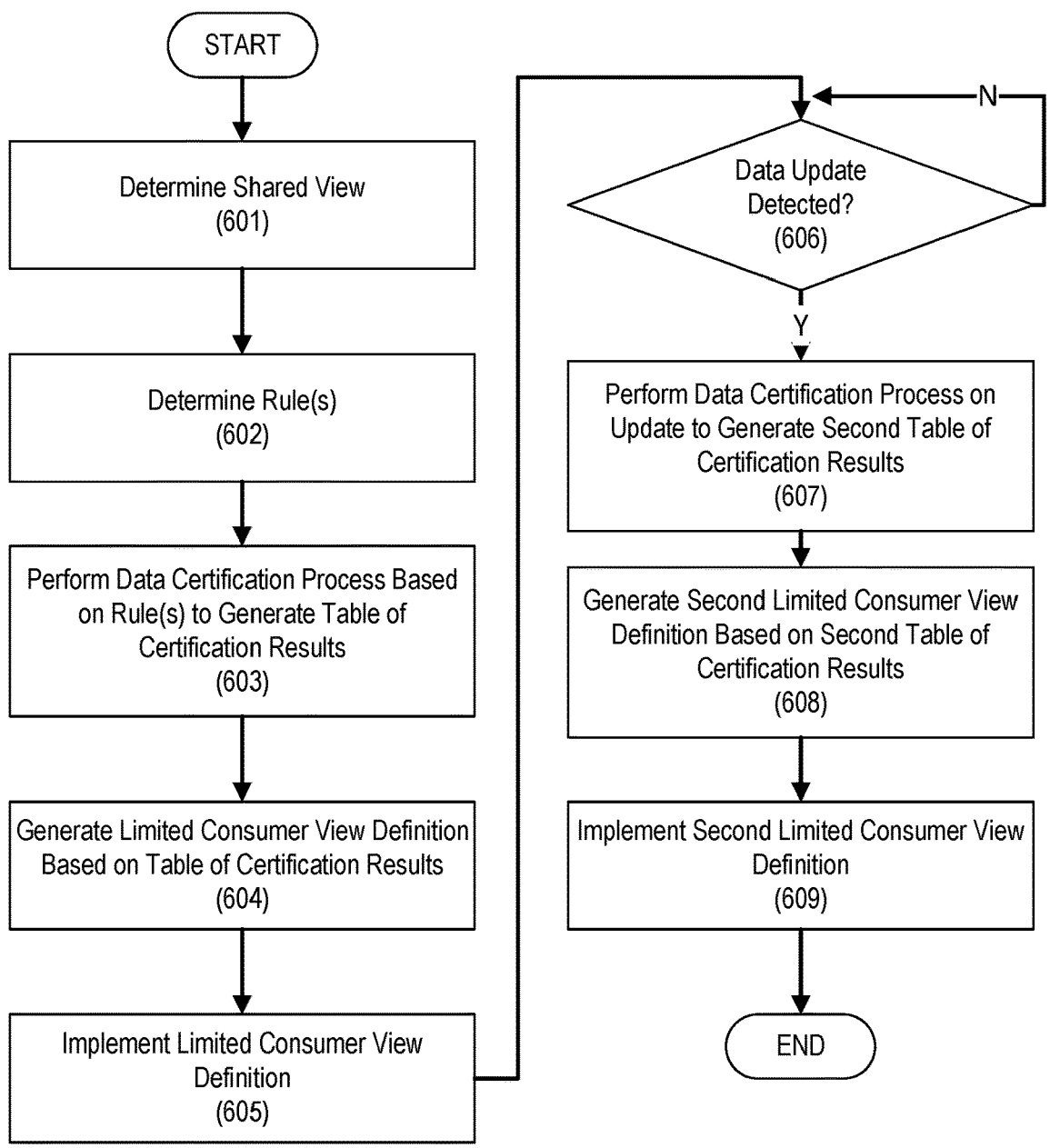
FIG. 6 shows a flow chart which may be performed to generate a updated limited consumer view definition based on an update to data.

As an introduction to FIG. 6, updates to the data stored by a database may occur over time. For example, records might be added, modified, or removed. In such circumstances, updates to the data might cause generation of updated limited consumer view definitions which reflect the changes to the data. In this way, consumers of that data receive the latest form of that data, albeit limited by the rules governing their access to that data. For example, based on a new record being added to data, a updated limited consumer view definition might be generated such that the updated limited consumer view definition indicates whether the new record satisfies one or more rules.

FIG. 6 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 6. The steps depicted in FIG. 6 may operate on a Snowflake environment or other virtual warehouse environment, such that they may be performed by a computing device within or external to such an environment. For example, the steps depicted in FIG. 6 may be performed on a user device external to the cloud database platform.

In step 601, a computing device may determine a shared view definition. For example, the computing device may determine a shared view definition for access to the database stored on the database server. As was discussed in FIG. 4, the shared view definition may be configured to provide access to all records stored by the database and to enable execution of queries against the database using processing resources of one or more virtual warehouses provided by the cloud database platform. This step may be the same or similar as step 401 of FIG. 4.

In step 602, the computing device may determine one or more rules. For example, the computing device may determine one or more first rules that specify criteria, associated with consumer permissions to access the database via the cloud database platform, that limit consumer access to the records stored by the database. This step may be the same or similar as step 402 of FIG. 4.

In step 603, the computing device may perform a data certification process based on the one or more rules to generate a table of certification results. For example, the computing device may perform, based on the one or more first rules, a data access certification process on the records stored by the database to generate a first table of certification results. This step may be the same or similar as step 403 of FIG. 4.

In step 604, the computing device may generate a limited consumer view definition based on the table of certification results. For example, the computing device may generate, based on an intersection of the first table of certification results and the shared view definition, a limited consumer view definition configured to provide access to a first portion of the records in compliance with the criteria of the one or more first rules and exclude a second portion of the records not in compliance with the criteria of the one or more first rules without modifying the records stored by the database. This step may be the same or similar as step 404 of FIG. 4.

In step 605, the computing device may implement the limited consumer view definition. For example, the computing device may cause a first virtual warehouse, of the one or more virtual warehouses, to execute a query on the records in compliance with the criteria of the one or more first rules via the limited consumer view definition. This step may be the same or similar as step 405 of FIG. 4.

In step 606, the computing device may determine whether it has detected an update to the data. For example, the computing device may detect, via the shared view definition, an update to at least one record of the records stored by the database. An update to the data may be any addition to, modification of, and/or removal of any portion of the data. For example, a record (e.g., a row of a table) may be added, removed, and/or one or more fields of the record may be modified.

Detecting the update to the data may comprise receiving, via a cloud database platform, an indication of an update to data. For example, the update may be detected using existing Snowflake functionality, such as the Streams functionality of Snowflake.

In step 607, the computing device may perform the data certification process on the update to generate a second table of certification results. For example, the computing device may perform the data access certification process on the updated records to generate a second table of certification results. The second table of certification results may indicate whether the update satisfies the one or more rules. In this circumstance, both the original table of certification results and the second table of certification results may be used to generate a second limited consumer view definition (as discussed below). For example, the new limited customer view definition (discussed below) might be generated based on a comparison of a first table of certification results and a second table of certification results. Additionally and/or alternatively, the second table of certification results may indicate whether all data, including the update detected in step 606, satisfies the one or more rules. In this circumstance, the second limited consumer view definition might be generated (as discussed below) based on the second table of certification results, and the previous table of certification results might be discarded if desired.

In step 608, the computing device may generate a second limited consumer view definition based on the second table of certification results. In this manner, a updated limited consumer view definition might be generated in view of the update detected in step 606. For example, the computing device may generate, based on the first table of certification results, the second table of certification results, and the shared view definition, a updated limited consumer view definition different from the limited consumer view definition. This step may be the same or similar as step 404 of FIG. 4, albeit in view of the second table of certification results.

In step 609, the computing device may implement the second limited consumer view definition. For example, the computing device may cause a first virtual warehouse, of the one or more virtual warehouses, to execute a query on the first portion of the records in compliance with the criteria of the one or more first rules via the updated limited consumer view definition. This step may be the same or similar as step 405 of FIG. 4.

Figure 7:
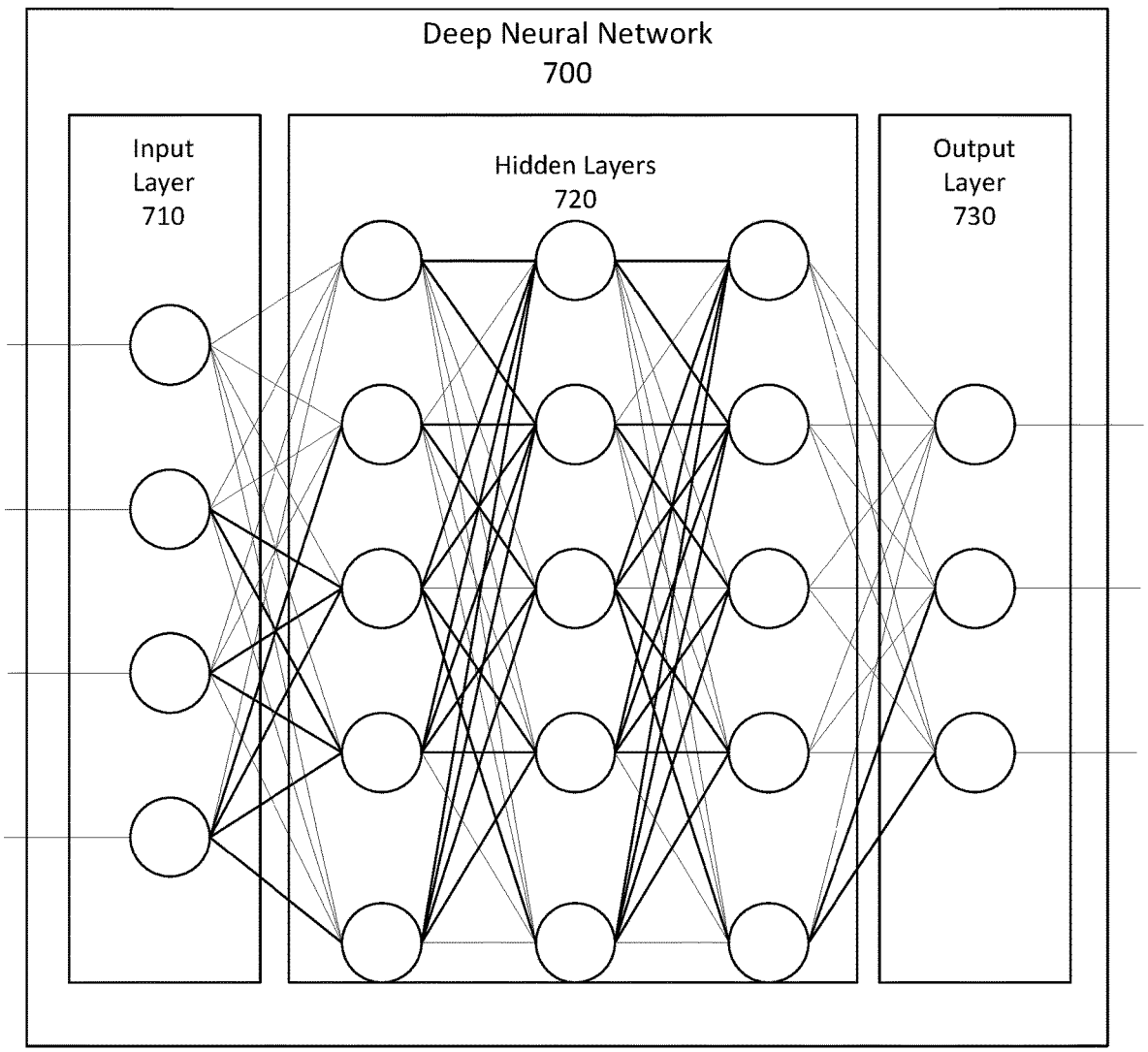
FIG. 7 depicts an example deep neural network architecture for a model according to one or more aspects of the disclosure.

FIG. 7 depicts an example deep neural network architecture 700. This architecture is one example of how a machine learning model might be implemented in order to, for example, prompt to the user for rules in accordance with step 503 of FIG. 5. The architecture depicted in FIG. 7 need not be performed on a single computing device, and may be performed by, e.g., a plurality of computers (e.g., any one of the devices depicted in FIG. 1). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 710, one or more hidden layers 720, and an output layer 730. A deep neural network, as used herein, may be an artificial network that has more than one hidden layer. Illustrated network architecture 700 is depicted with three hidden layers, and thus may be considered a deep neural network. The number of hidden layers employed in deep neural network 700 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

FIG. 8 depicts examples of applications of a shared view definition 800, a first limited consumer view definition 803*a*, and a second limited consumer view definition 803*b* with respect to each illustrative data. Each of these views are depicted as executed on an illustrative set of data. Particularly, as shown in FIG. 8, the shared view definition 800 shows all data from a database, whereas the first limited consumer view definition 803*a* and the second limited consumer view definition 803*b* show different subsets of the data based on the application of one or more rules. The shared view definition 800, first limited consumer view definition 803*a*, and/or the second limited consumer view definition 803*b* may be represented in data in entirely different formats. For example, the shared view definition 800 might be represented as a query that causes a database to return all records of data, whereas the first limited consumer view definition might be represented in data as a listing of fields of records to be replaced and/or otherwise obfuscated.

The shared view definition 800 is shown outputting three columns: a name column 801*a*, a credit card number column 801*b*, and a location column 801*c*. The shared view definition 800 is shown outputting three rows: a first record 802*a*, a second record 802*b*, and a third record 802*c*. The shared view definition 800 in this example is showing all fields of all records of data, such that no data is shown as obfuscated and/or otherwise modified.

The first limited consumer view definition 803*a* is shown outputting the same columns (the name column 801*a*, the credit card number column 801*b*, and the location column 801*c*), except that fields in all three records (e.g., the first record 802*a*, the second record 802*b*, and the third record 802*c*) have been modified according to one or more rules. In particular, the last names in the name column 801*a* have been replaced with "LASTNAME," the credit card numbers in the credit card number column 801*b*, have been truncated to their last four digits, and the locations in the location column 801c have been modified to reflect a general region of the United States. These modifications might, for example, reflect three rules: a first rule requiring that last names be replaced with "LASTNAME," a second rule requiring that credit card numbers be truncated to their last four digits, and a third rule that requires that location information be replaced with an indication of their general region in the United States. That said, the underlying data need not be changed: for example, the database may still store the name "Bob Smith," even if the name is displayed as "Bob LASTNAME" to a particular consumer of data.

The second limited consumer view definition 803b is shown outputting the same columns (the name column 801a, the credit card number column 801b, and the location column 801c), except that an entire column (the credit card number column 801b) has been removed. This may reflect a rule that prevents access, by a consumer, to credit card numbers. As was the case with the first limited consumer view definition 803a, the underlying data stored by the database need not change: rather, all that has changed is that a consumer is prevented from accessing the column.

FIG. 9 depicts an illustrative user interface 900, such as might be generated as part of step 503 of FIG. 5. The user interface 900 depicts various options which might be presented to a user as part of making rules for that specify criteria, associated with consumer permissions to access the database via the cloud database platform, that limit consumer access to the records stored by the database. For example, the user interface 900 shows that a user might be able to select options relating to what sort of geographic regions data will be shown from (e.g., New York City, Boston, Virginia), whether credit cards will be shown in whole or in part, and whether last names should be obfuscated. Based on user selections in this user interface 900, one or more rules may be generated.

FIG. 10 depicts an illustrative listing of rules 1000. The rules 1000 may include a first rule 1001a indicating that no invalid values should be output. For example, this rule might prevent output of "NaN" (not a number) values in fields expected to contain numbers. The rules 1000 may include a second rule 1001b indicating that no birthdates after a current date should be displayed. This rule may, in practice, prevent output of potentially invalid (or, at least, speculative) data. The rules 1000 may include a third rule 1001c indicating that no non-16-digit credit card numbers should be displayed. Such a rule may, as with the previous rule, prevent output of potentially invalid data. The rules 1000 may include a fourth rule 1001d indicating that no data older than 3 years old should be displayed. This may, in practice, prevent output of particularly old data.

Figure 11:
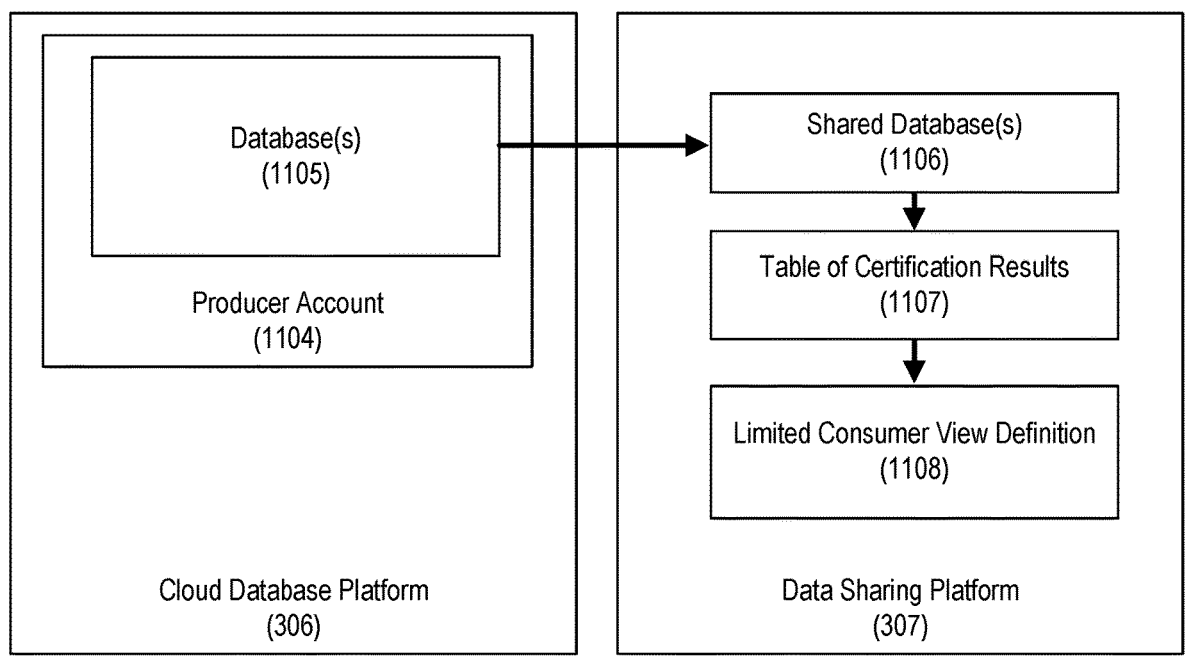
FIG. 11 depicts an illustrative architecture for a data certification process.

FIG. 11 depicts an illustrative architecture for a data certification process discussed in FIG. 4, FIG. 5, and FIG. 6. The architecture depicted in FIG. 11 might be implemented through one or more computing devices, such as those depicted in any one or more of FIG. 1, FIG. 2, and/or FIG. 3. One or more aspects of the architecture may be implemented through one or more non-transitory computer-readable memory storing instructions that, when executed by one or more processors, cause a computing device to perform one or more steps, such as the steps depicted in any one of FIG. 4, FIG. 5, and/or FIG. 6.

A cloud database platform 306, such as the Snowflake platform, may comprise one or more data producer accounts, such as the producer account 1104. The producer account 1104 may manage (e.g., create, edit) one or more databases, such as databases 1105. The databases 1105 may be the same or similar as the databases 120 of FIG. 3. The databases 1105 may be shared, as shared databases 1106, via a data sharing platform 307. The data sharing platform 307 may be, for example, a multi-tenant virtual private server. The data sharing platform 307 need not be managed by the same entity as the cloud database platform 306. For example, the cloud database platform 306 might be managed by a first entity, and the data sharing platform 307 may be managed by a different entity. Once shared, a table of certification results 1107 may be generated via the data sharing platform 307 in accordance with, e.g., step 403 of FIG. 4, step 505 of FIG. 5, and/or step 603 of FIG. 6. Then, a limited customer view definition 1108 may be generated via the data sharing platform 307.

In practice, the data sharing platform 307 may be used to implement the sharing of data. A data producer may be willing to provide (e.g., for a fee) access to its data on the cloud database platform 306. The cloud database platform 306 and/or the data sharing platform 307 may thereby implement a data sharing marketplace, whereby producers and consumers of data may exchange data as desired. As such, each producer and/or consumer of data may maintain their own producer account(s) (e.g., the producer account 1104) and their own database(s) (e.g., the databases 1105), and may provide access to those databases as desired via the marketplace.

Say, for example, that a data producer associated with the producer account 1104 agrees to share their database(s) with a consumer. Such a decision might have been made via negotiation through a data marketplace, such as based on a contractual agreement between the data producer and the consumer. In such a circumstance, the data producer may, via the cloud database platform 306 and/or the data sharing platform 307, cause the database(s) to be shared as the shared database(s) 1106. Note that this process need not entail changes to the data: as indicated above, the zero copy functionality of Snowflake would permit such sharing without the need for data to be copied. Once shared, the data producer, the consumer, and/or other entities may specify one or more rules, which may be used (as described above in, e.g., FIG. 4, FIG. 5, and/or FIG. 6) to generate the table of certification results 1107. Some or all of those rules might have been specified by the contract governing the sharing of the databases 1105. That table of certification results may be used (as described above in, e.g., FIG. 4, FIG. 5, and/or FIG. 6) to generate the limited customer view definition 1108. The limited customer view definition 1108 may then be used to limit access, by the consumer, to the databases 1105 shared as the shared databases 1106.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A data sharing platform configured to provide access to records of a database stored on a database server, the data sharing platform comprising:
   one or more processors; and
   memory storing instructions that, when executed by the one or more processors, cause the data sharing platform to:
   determine one or more first rules that specify criteria, associated with consumer permissions to access the database via a cloud database platform, that limit consumer access to the records stored by the database;
   perform, based on the one or more first rules, a data access certification process on the records stored by the database to generate a table of certification results by causing the data sharing platform to:
   access all the records stored by the database;
   generate a data certification result for each record based on determining, for each record, whether a given record satisfies the criteria of the one or more first rules based on one or more fields of the given record; and
   generate, based on the data certification result for each record, the table of certification results that indicates, for each record, whether the record satisfies the criteria of the one or more first rules;
   generate, based on the table of certification results, and without modifying the records stored by the database, a limited consumer view definition configured to provide access to a first portion of the records in compliance with the criteria of the one or more first rules and exclude a second portion of the records not in compliance with the criteria of the one or more first rules; and
   cause a first virtual warehouse provided by the cloud database platform to execute a query on the first portion of the records in compliance with the criteria of the one or more first rules via the limited consumer view definition.

2. The data sharing platform of claim 1, wherein the instructions, when executed by the one or more processors, further cause the data sharing platform to:
   cause output of a result of the query to a consumer authorized to access the database through the limited consumer view definition.

3. The data sharing platform of claim 1, wherein the instructions, when executed by the one or more processors, further cause the data sharing platform to:
   receive an update to the one or more first rules;
   perform, based on the update to the one or more first rules, the data access certification process to generate a second table of certification results; and
   generate, based on the second table of certification results, a updated limited consumer view definition.

4. The data sharing platform of claim 1, wherein the instructions, when executed by the one or more processors, cause the data sharing platform to generate the table of certification results by further causing the data sharing platform to:
   add, to the table of certification results and based on at least one of the one or more first rules, an indication that a first value in a first field should be replaced with a second value.

5. The data sharing platform of claim 1, wherein at least one of the one or more first rules prevent one or more of:
   output of invalid values;
   output of values outside of a predefined range; or
   output of values that do not match a regular expression pattern.

6. The data sharing platform of claim 1, wherein at least one rule of the one or more first rules is configured to prevent output of data outside a time period specified by the at least one rule.

7. The data sharing platform of claim 1, wherein at least one of the one or more first rules is configured to cause output of an alert based on a determination that more than a predetermined percentage of the records is not output based on the one or more first rules.

8. A method for providing access to records of a database stored on a database server, the method comprising:
   determining, by a data sharing platform, one or more first rules that specify criteria, associated with consumer permissions to access the database via a cloud database platform, that limit consumer access to the records stored by the database;
   performing, based on the one or more first rules, a data access certification process on the records stored by the database to generate a table of certification results by:
   accessing all the records stored by the database;
   generating a data certification result for each record based on determining, for each record, whether a given record satisfies the criteria of the one or more first rules based on one or more fields of the given record; and
   generating, based on the data certification result for each record, the table of certification results that indicates, for each record, whether the record satisfies the criteria of the one or more first rules;
   generating, based on the table of certification results, and without modifying the records stored by the database, a limited consumer view definition configured to provide access to a first portion of the records in compliance with the criteria of the one or more first rules and exclude a second portion of the records not in compliance with the criteria of the one or more first rules; and
   causing a first virtual warehouse provided by the cloud database platform to execute a query on the first portion of the records in compliance with the criteria of the one or more first rules via the limited consumer view definition.

9. The method of claim 8, further comprising:
causing output of a result of the query to a consumer authorized to access the database through the limited consumer view definition.

10. The method of claim 8, further comprising:
receiving an update to the one or more first rules;
performing, based on the update to the one or more first rules, the data access certification process to generate a second table of certification results; and
generating, based on the second table of certification results, a updated limited consumer view definition.

11. The method of claim 8, wherein generating the table of certification results further comprises:
adding, to the table of certification results and based on at least one of the one or more first rules, an indication that a first value in a first field should be replaced with a second value.

12. The method of claim 8, wherein at least one of the one or more first rules prevent one or more of:
output of invalid values;
output of values outside of a predefined range; or
output of values that do not match a regular expression pattern.

13. The method of claim 8, wherein at least one rule of the one or more first rules is configured to prevent output of data outside a time period specified by the at least one rule.

14. The method of claim 8, wherein at least one of the one or more first rules is configured to cause output of an alert based on a determination that more than a predetermined percentage of the records is not output based on the one or more first rules.

15. One or more non-transitory computer-readable media storing instructions that, when executed by one or more processors of a data sharing platform, cause the data sharing platform to provide access to records of a database stored on a database server by causing the data sharing platform to:
determine one or more first rules that specify criteria, associated with consumer permissions to access the database via a cloud database platform, that limit consumer access to the records stored by the database;
perform, based on the one or more first rules, a data access certification process on the records stored by the database to generate a table of certification results by causing the data sharing platform to:
access all the records stored by the database;
generate a data certification result for each record based on determining, for each record, whether a given record satisfies the criteria of the one or more first rules based on one or more fields of the given record; and
generate, based on the data certification result for each record, the table of certification results that indicates, for each record, whether the record satisfies the criteria of the one or more first rules;
generate, based on the table of certification results, and without modifying the records stored by the database, a limited consumer view definition configured to provide access to a first portion of the records in compliance with the criteria of the one or more first rules and exclude a second portion of the records not in compliance with the criteria of the one or more first rules; and
cause a first virtual warehouse provided by the cloud database platform to execute a query on the first portion of the records in compliance with the criteria of the one or more first rules via the limited consumer view definition.

16. The non-transitory computer-readable media of claim 15, wherein the instructions, when executed by the one or more processors, further cause the data sharing platform to:
cause output of a result of the query to a consumer authorized to access the database through the limited consumer view definition.

17. The non-transitory computer-readable media of claim 15, wherein the instructions, when executed by the one or more processors, further cause the data sharing platform to:
receive an update to the one or more first rules;
perform, based on the update to the one or more first rules, the data access certification process to generate a second table of certification results; and
generate, based on the second table of certification results, a updated limited consumer view definition.

18. The non-transitory computer-readable media of claim 15, wherein the instructions, when executed by the one or more processors, cause the data sharing platform to generate the table of certification results by further causing the data sharing platform to:
add, to the table of certification results and based on at least one of the one or more first rules, an indication that a first value in a first field should be replaced with a second value.

19. The non-transitory computer-readable media of claim 15, wherein at least one of the one or more first rules prevent one or more of:
output of invalid values;
output of values outside of a predefined range; or
output of values that do not match a regular expression pattern.

20. The non-transitory computer-readable media of claim 15, wherein at least one rule of the one or more first rules is configured to prevent output of data outside a time period specified by the at least one rule.

* * * * *